US012345382B1

(12) United States Patent
Liang

(10) Patent No.: US 12,345,382 B1
(45) Date of Patent: Jul. 1, 2025

(54) LED GLASS BULB AND LED LIGHT STRING

(71) Applicant: Nanning City Hong Cai Illuminations Technology Company Limited, Nanning (CN)

(72) Inventor: Faquan Liang, Nanning (CN)

(73) Assignee: NANNING CITY HONG CAI ILLUMINATIONS TECHNOLOGY COMPANY LIMITED, Nanning (CN)

( * ) Notice: Subject to any disclaimer, the term of this patent is extended or adjusted under 35 U.S.C. 154(b) by 0 days.

(21) Appl. No.: 18/806,144

(22) Filed: Aug. 15, 2024

(51) Int. Cl.
*F21S 4/10* (2016.01)
*F21K 9/235* (2016.01)
*F21Y 115/10* (2016.01)

(52) U.S. Cl.
CPC ................ *F21S 4/10* (2016.01); *F21K 9/235* (2016.08); *F21Y 2115/10* (2016.08)

(58) Field of Classification Search
CPC .................................. F21K 9/235; F21S 4/10
See application file for complete search history.

(56) References Cited

U.S. PATENT DOCUMENTS

2024/0110694 A1* 4/2024 Lam ........................ F21V 23/06

FOREIGN PATENT DOCUMENTS

CN 105909996 A 8/2016
CN 207906899 U * 9/2018

* cited by examiner

*Primary Examiner* — Karabi Guharay
(74) *Attorney, Agent, or Firm* — SHIMOKAJI IP

(57) ABSTRACT

A LED glass bulb includes a glass shade and an LED chip component. The LED chip component includes an LED chip, a first conductive pin, and a second conductive pin. The first and second conductive pins are spaced apart, the first conductive pin is connected to the LED chip via a first curved conductive strip, and the second conductive pin is connected to the LED chip via a second curved conductive strip. A first end of the glass shade is provided with a sealing connection base, the first and second conductive pins are embedded in and pass through the sealing connection base, and the LED chip, the first and second curved conductive strips are located inside the glass shade. The LED glass bulb can prevent damage to the LED chip during glass sintering sealing processes, thereby ensuring product quality, improving yield, increasing production efficiency, and reducing costs.

12 Claims, 5 Drawing Sheets

LED GLASS BULB AND LED LIGHT STRING

RELATED APPLICATIONS

This application claims the benefit of priority to Chinese Patent Application No. 202421486863X filed on Jun. 26, 2024, which is hereby incorporated by reference in its entirety.

FIELD OF THE INVENTION

The present invention relates to the field of lighting devices, particularly to an LED glass bulb and a LED light string.

BACKGROUND OF THE INVENTION

The traditional manufacturing process of tungsten filament lamps involves placing the tungsten filament inside a hollow glass bulb and then sealing the opening of the glass bulb by sintering. During the sintering process, high temperatures are generated, which may not affect the performance of the tungsten due to its high temperature resistance. But in view of energy-saving and longer lifespan considerations, LED lamps are now widely considered, and LED lamps are to replace tungsten filaments in glass bulbs. However, the high-temperature sintering process of glass sealing may damage the LED chip, leading to unstable quality of LED glass bulbs, low yield in production, and low efficiency and high costs. If the opening of glass shade is sealed by other structures, additional sealing components are required to complicate the assembly process and make the structure of LED glass bulbs complicated, thereby increasing the production costs. Therefore, there is an urgent need for an improved LED glass bulb to meet the market demands.

SUMMARY OF THE INVENTION

The purpose of the present application is to provide an LED glass bulb and LED light string that has an improved structure to prevent damage to the LED chip during glass sintering sealing processes, thereby ensuring product quality, improving yield, increasing production efficiency, and reducing costs.

To achieve the above objectives, the present invention provides a LED glass bulb including a glass shade and an LED chip component. The LED chip component includes an LED chip, a first conductive pin, and a second conductive pin, the first conductive pin and the second conductive pin are spaced apart, the first conductive pin is connected to the LED chip via a first curved conductive strip, and the second conductive pin is connected to the LED chip via a second curved conductive strip. A first end of the glass shade is provided with a sealing connection base formed by sintering the glass shade, the first conductive pin and the second conductive pin are embedded in and pass through the sealing connection base, and the LED chip, the first curved conductive strip, and the second curved conductive strip all are located inside the glass shade.

As an embodiment, the first curved conductive strip includes at least one first S-shaped bending portion, and the second curved conductive strip includes at least one second S-shaped bending portion.

As an embodiment, both the first curved conductive strip and the second curved conductive strip have a flattened structure in a width direction.

As an embodiment, the first curved conductive strip includes a first connecting portion connected to the first conductive pin, with the first connecting portion being soldered to the first conductive pin; and the second curved conductive strip includes a second connecting portion connected to the second conductive pin, with the second connecting portion being soldered to the second conductive pin.

As an embodiment, the first curved conductive strip is integrally formed with the first conductive pin, and the second curved conductive strip is integrally formed with the second conductive pin.

As an embodiment, a resistor element is connected in series with the first conductive pin or the second conductive pin.

As an embodiment, a second end of the glass shade opposite to the first end is provided with a sealing end formed by sintering the glass shade, and a sealed cavity is formed inside the glass shade.

As an embodiment, the sealing connection base has a cambered surface, and the sealing end has a tip.

The present application further provides a LED light string including multiple LED glass bulbs mentioned above, wherein the multiple LED glass bulbs are connected in series, in parallel, or in series and parallel.

Compared with the prior art, The LED glass bulb according to the embodiment of the present application is configured with the first curved conductive strip and the second curved conductive strip, thus the path length of heat transfer of the high temperature generated by sintering the first end of the glass shade is extended, that is, the path length of the heat transfer from the first and second conductive pins to the LED chip is extended due to the presences of the first and second curved conductive strips. This maximizes the heat dissipation to the surrounding environment during the heat transfer process, reduces the impact of high temperatures on the LED chip, and avoids damage to the LED chip.

BRIEF DESCRIPTION OF THE DRAWINGS

To better illustrate the technical solution of embodiments of the present application, the drawings used in the description of embodiments of the present application are briefly introduced below. Obviously, the drawings described below are merely some embodiments of the present application, and other drawings can be obtained by those skilled in the art without creative work.

REFERENCE NUMERALS

Figure 1:
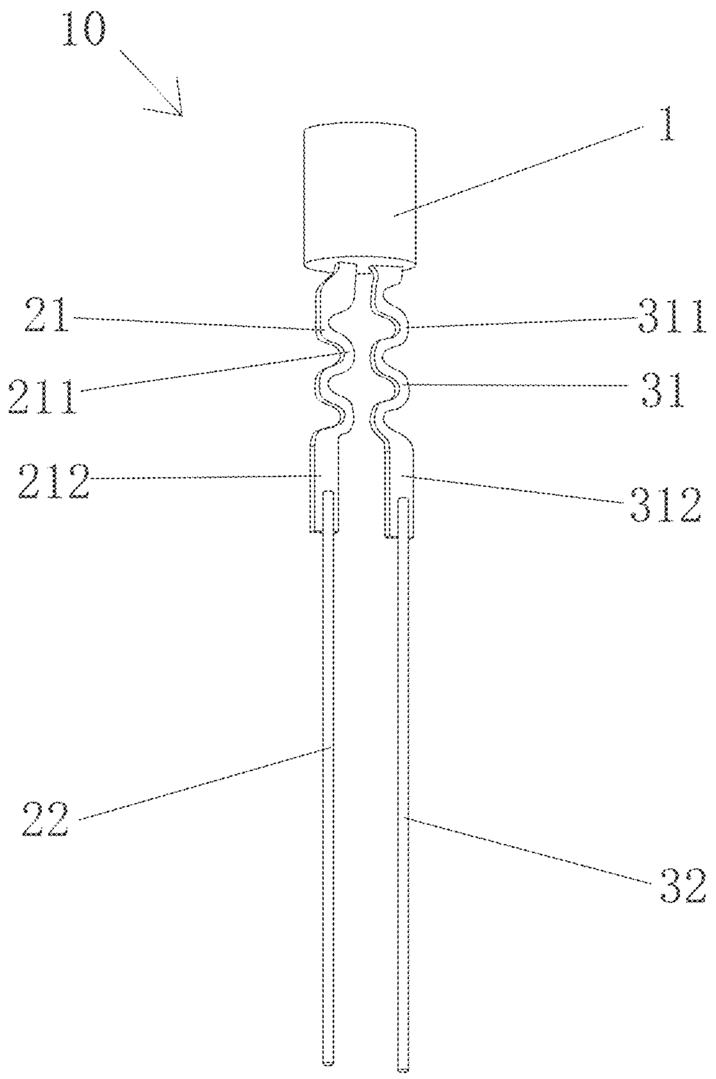
FIG. 1 is a structural diagram of an LED chip component of an LED glass bulb according to an embodiment of the present application.

100, LED glass bulb; 100*a*, LED glass bulb; 10/10*b*, LED chip component; 1, LED chip; 21/21*b*, first curved conductive strip; 211, first S-shaped bending portion; 212, first connecting portion; 22/22*b*, first conductive pin; 31/31*b*, second curved conductive strip; 311, second S-shaped bending portion; 312, second connecting portion; 32/32*b*, second conductive pin; 4, resistor element; 20, glass shade; 201, sealing connection base; 201*a*, cambered surface; 2011, first end; 202, sealing end; 202*a*, tip; 2021, second end; 203, sealed cavity; 30, wire; 5, LED light string.

DETAILED DESCRIPTION OF ILLUSTRATED EMBODIMENTS

To provide a detailed explanation of the technical content, structural features, and achieved effects of the present application, the following embodiments are described in conjunction with the accompanying drawings.

In the description of the present application, it is important to understand that terms such as "longitudinal", "radial", "length", "width", "thickness", "top", "bottom", "front", "rear", "left", "right", "vertical", "horizontal", "top", "bottom", "inner", and "outer" indicate orientations or positional relationships based on those shown in the drawings. These terms are used for descriptive convenience and simplification, rather than indicating or implying that the device or component must have specific orientations, or be constructed and operated in specific orientations, which should not be understood as limiting the present application. In the description of this present application, unless otherwise specified, the term "multiple" means two or more.

In the description of this present application, it should be noted that, unless otherwise expressly specified and limited, terms such as "installation/install", "connection/connect", and "communication/communicate" and the like should be broadly interpreted. For example, they can refer to fixed connections, detachable connections, or integral connections; mechanical or electrical connections; direct connections or indirect connections through intermediaries; or communication within two components. For those skilled in the art, these terms can be understood in specific contexts in this present application.

Figure 2:
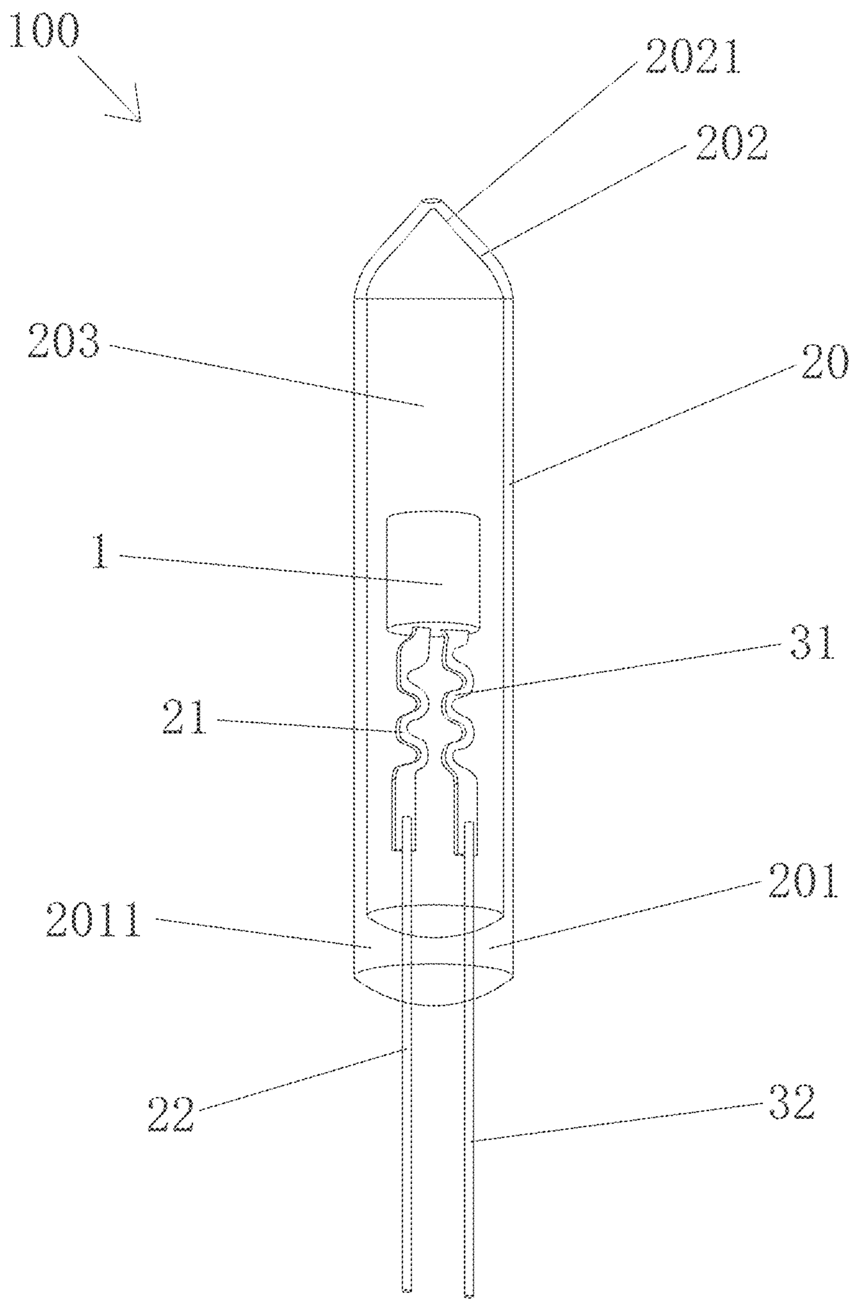
FIG. 2 is a structural diagram of an LED glass bulb according to an embodiment of the present application.

As shown in FIGS. 1 to 2, an LED glass bulb 100 according to an embodiment of the present application includes a glass shade 20 and an LED chip component 10. The LED chip component 10 includes an LED chip 1, a first conductive pin 22, and a second conductive pin 32, and the first conductive pin 22 and the second conductive pin 32 are spaced apart. The first conductive pin 22 is connected to the LED chip 1 via a first curved conductive strip 21, and the second conductive pin 32 is connected to the LED chip 1 via a second curved conductive strip 31. The first end 2011 of the glass shade 20 is provided with a sealing connection base 201 formed by sintering the glass shade 20. The first conductive pin 22 and the second conductive pin 32 are embedded in and pass through the sealing connection base 201. The LED chip 1, the first curved conductive strip 21, and the second curved conductive strip 31 are all located inside the glass shade 20.

Specifically, the glass shade 20 is made of glass material, and the sealing connection base 201 is formed by using high-temperature flame to melt and bond part of the material of the glass shade 20 by glass-to-metal sealing technology. The sealing connection base 201 is configured to seal the first end 2011 of the glass shade 20, and meanwhile fix the LED chip component, thereby ensuring the stability of the light emitted by the LED chip 1. The LED chip 1 includes a positive electrode and a negative electrode. The first curved conductive strip 21 is electrically connected to one of the electrodes, and the second curved conductive strip 31 is electrically connected to the other electrode.

The LED glass bulb according to the embodiment of the present application is configured with the first curved conductive strip 21 and the second curved conductive strip 31, thus the path length of heat transfer of the high temperature generated by sintering the first end 2011 of the glass shade 20 is extended, that is, the path length of the heat transfer from the first and second conductive pins 22, 32 to the LED chip 1 is extended due to the presences of the first and second curved conductive strips. This maximizes the heat dissipation to the surrounding environment during the heat transfer process, reduces the impact of high temperatures on the LED chip 1, and avoids damage to the LED chip 1.

In the embodiment of the present application, the first curved conductive strip 21 includes at least one first S-shaped bending portion 211, and the second curved conductive strip 31 includes at least one second S-shaped bending portion 311. Specifically, the material of the first curved conductive strip 21 and the second curved conductive strip 31 can be copper-nickel plated material or iron-nickel plated material. The first curved conductive strip 21 may include two first S-shaped bending portions 211, and the second curved conductive strip 31 may include two second S-shaped bending portions 311. Of course, the number of first S-shaped bending portions 211 and second S-shaped bending portions 311 can be set upon the specific requirements, which is not limited here. In addition, the first curved conductive strip 21 and the second curved conductive strip 31 are not limited to S-shaped bends and may also be helical bends or other configurations as needed to extend the path length from the sealing connection base 201 to the LED chip 1.

In the embodiment of the present application, the first curved conductive strip 21 and the second curved conductive strip 31 have a flattened structure in the width direction. In such configurations, the width of the first curved conductive strip 21 and the second curved conductive strip 31 is increased, thereby increasing the area of heat conduction and facilitating heat dissipation, and accordingly reducing damage to the LED chip 1 and improving the yield of the LED glass bulb 100.

In the embodiment of the present application, the first curved conductive strip 21 includes a first connecting portion 212 connected to the first conductive pin 22, with the first connecting portion 212 being soldered to the first conductive pin 22. The second curved conductive strip 31 includes a second connecting portion 312 connected to the second conductive pin 32, with the second connecting portion 312 being soldered to the second conductive pin 32. Both the first conductive pin 22 and the second conductive pin 32 are metal wires, and the metal wires are made of dumet wires. The first connecting portion 212 is in a flattened structure in the width direction, and the width of the first connecting portion 212 is larger than the diameter of the first conductive pin 22, thus the soldering between the first connecting portion 212 and the first conductive pin 22 are convenient and reliable. Similarly, the second connecting portion 312 is in a flattened structure in the width direction, and the width of the second connecting portion 312 is larger than the diameter of the second conductive pin 32, thus the soldering between the second connecting portion 312 and the second conductive pin 32 is convenient and reliable. The first conductive pin 22 and the second conductive pin 32 are respectively connected to the positive and negative electrodes of the external circuit to form a complete electrical circuit.

Figure 4:
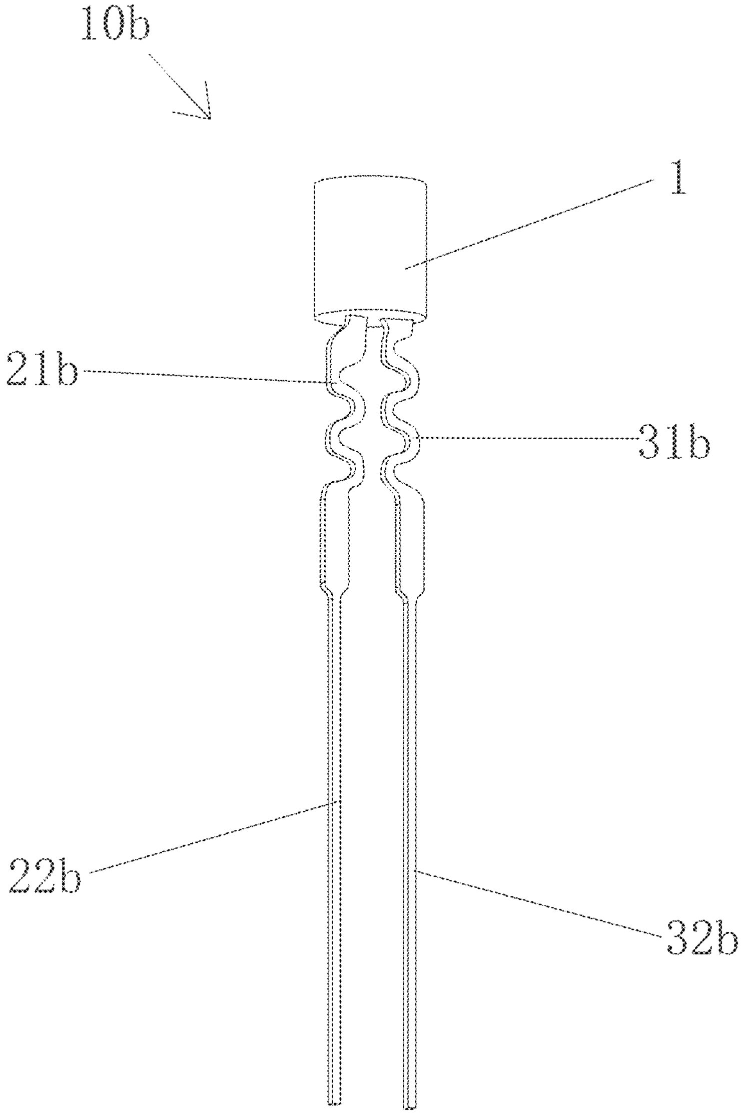
FIG. 4 is another structural diagram of an LED chip component of an LED glass bulb according to the present application.

In other embodiments, as shown in FIG. 4, the first curved conductive strip 21*b* is integrally formed with the first conductive pin 22*b*, and the second curved conductive strip 31*b* is integrally formed with the second conductive pin 32*b*. Specifically, the material of the first curved conductive strip 21*b*, the first conductive pin 22*b*, the second curved conductive strip 31*b*, and the second conductive pin 32*b* can all be copper-nickel plated material or iron-nickel plated material. In such integral structure, the reliability of the LED chip component 10*b* is improved since it's unnecessary to proceed with welding process between the first curved conductive strip 21*b* and the first conductive pin 22*b*, and between the second curved conductive strip 31*b* and the second conductive pin 32*b*.

Figure 3:
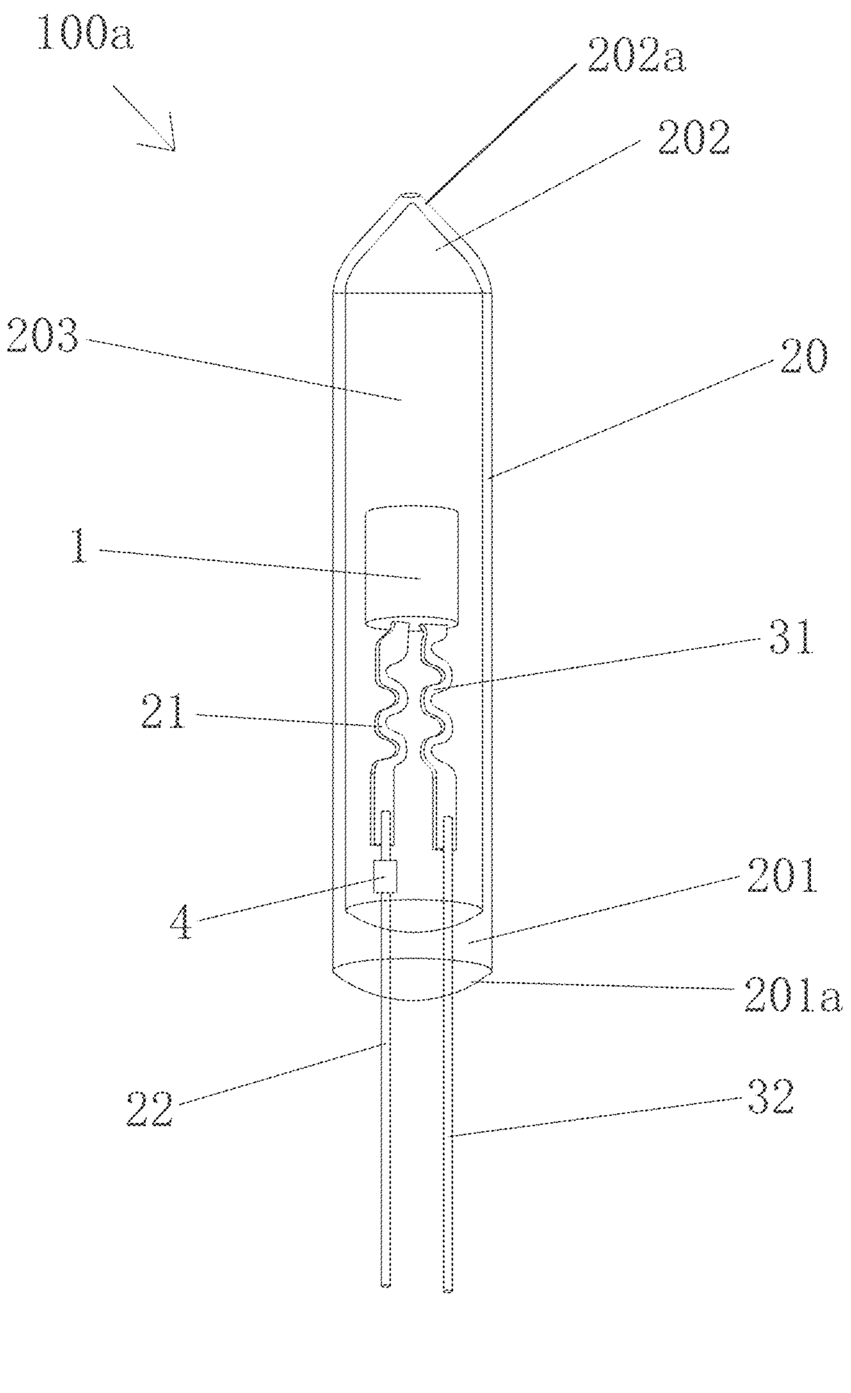
FIG. 3 is a structural diagram of another specific embodiment of an LED glass bulb according to an embodiment of the present application.

In other embodiments, a resistor element 4 is connected in series on the first conductive pin 22 or the second conductive pin 32. Specifically, as shown in FIG. 3, the resistor element 4 is electrically connected on the first conductive pin 22 and is located inside the glass shade 20. The resistor element 4 can specifically be a carbon film resistor, which can reduce the voltage on the LED chip 1, thereby protecting the LED glass bulb 100*a*.

In the embodiments of the present application, the LED chip 1 can be located in the middle of the glass shade 20, with the second end 2021 of the glass shade 20 opposite to the first end 2011 being provided with a sealing end 202 formed by sintering the glass shade 20, thereby forming a sealed cavity 203 inside the glass shade 20. Specifically, the manufacturing process of the LED glass bulb 100 of the present application is as follows. Firstly, an LED chip component 10 and a glass tube with openings at both ends are provided. The LED chip component 10 is positioned inside the glass tube at an appropriate position to ensure that parts of the first conductive pin 22 and the second conductive pin 32 are located inside the glass tube while another part of the first conductive pin 22 and the second conductive pin 32 is located outside the glass tube. The end of the glass tube close to the first conductive pin 22 and the second conductive pin 32 is applied with high-temperature sealing technology of glass and metal sintering to form a sealing connection base 201, and then the other end of the glass tube is applied with high-temperature sealing technology of glass and metal sintering to form a sealing end 202. In such a way, the LED glass bulb 100 of the present invention is formed. It's noted that, the sealing connection base 201 and the sealing end 202 in the embodiment of the present application are formed by using high temperature flame to melt part of materials of the glass tube, thereby effectively simplifying the structure and the assembly process, with lower cost and better effect. The specific shape of the sealing connection base 201 and the sealing end 202 is optional according to actual needs, such as the sealing connection base 201 may have a cambered surface 201*a* (referring to FIG. 3), and the sealing end 202 has a tip 202*a*, which achieves good appearance.

In summary, the LED glass bulb 100 according to the present application has reasonable structure, which effectively reduces the use of product parts, greatly reduces the processing process, greatly improves production efficiency, and reduces production costs. Furthermore, the LED chip component 10 is configured, thus the LED chip 1 has long life, high light efficiency, low energy consumption and is environmentally friendly, which can completely replace the traditional tungsten glass bulb.

Figure 5:
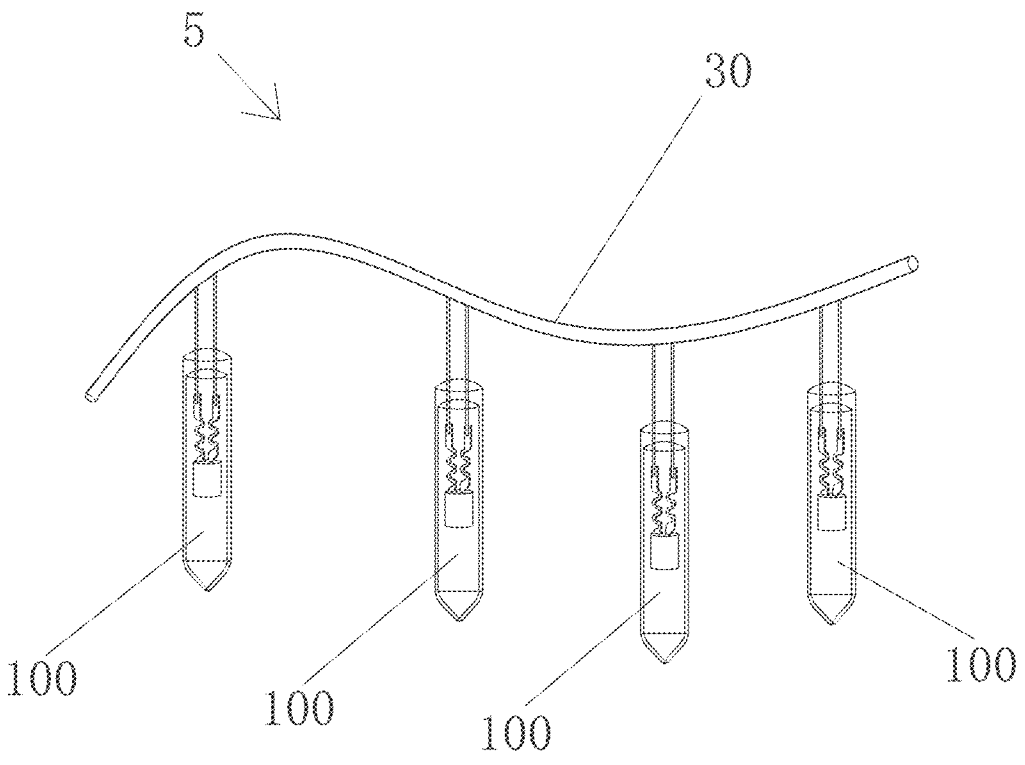
FIG. 5 is a schematic diagram of an LED light string according to the present application.

As shown in FIG. 1 to FIG. 5, the embodiment of the present application further provides an LED light string 5 including a plurality of the LED glass bulbs 100. The LED glass bulbs 100 may be arranged in series, in parallel, or in series and parallel. Specifically, as shown in FIG. 5, multiple LED glass bulbs 100 are connected in parallel to the wire 30.

The above-mentioned embodiments only represent several embodiments of the present invention, and the descriptions thereof are relatively specific and detailed, but should not be construed as limiting the scope of the patent invention. It should be pointed out that for those skilled in the art, several modifications and improvements can be made without departing from the concept of the present invention, which all belong to the protection scope of the present invention. Therefore, the scope of protection of the patent of the present invention shall be subject to the appended claims.

What is claimed is:

1. An LED glass bulb, comprising a glass shade and an LED chip component, wherein the LED chip component comprises an LED chip, a first conductive pin, and a second conductive pin, the first conductive pin and the second conductive pin are spaced apart, the first conductive pin is connected to the LED chip via a first curved conductive strip, and the second conductive pin is connected to the LED chip via a second curved conductive strip;

a first end of the glass shade is provided with a sealing connection base formed by sintering the glass shade, the first conductive pin and the second conductive pin are embedded in and pass through the sealing connection base, and the LED chip, the first curved conductive strip, and the second curved conductive strip all are located inside the glass shade;

wherein the sealing connection base and the glass shade are integrally formed in a one-piece structure, the first curved conductive strip and the first conductive pin are integrally formed in a one-piece structure, and the second curved conductive strip and the second conductive pin are integrally formed in a one-piece structure.

2. The LED glass bulb according to claim 1, wherein the first curved conductive strip comprises at least one first S-shaped bending portion, and the second curved conductive strip comprises at least one second S-shaped bending portion.

3. The LED glass bulb according to claim 2, wherein both the first curved conductive strip and the second curved conductive strip have a flattened structure in a width direction.

4. The LED glass bulb according to claim 1, wherein a resistor element is connected in series with the first conductive pin or the second conductive pin.

5. The LED glass bulb according to claim 1, wherein a second end of the glass shade opposite to the first end is provided with a sealing end formed by sintering the glass shade, and a sealed cavity is formed inside the glass shade.

6. The LED glass bulb according to claim 5, wherein the sealing connection base has a cambered surface, and the sealing end has a tip.

7. An LED light string, comprising multiple LED glass bulbs according to claim 1, wherein the multiple LED glass bulbs are connected in series, in parallel, or in series and parallel.

8. The LED light string according to claim 7, wherein the first curved conductive strip comprises at least one first S-shaped bending portion, and the second curved conductive strip comprises at least one second S-shaped bending portion.

9. The LED light string according to claim 8, wherein both the first curved conductive strip and the second curved conductive strip have a flattened structure in a width direction.

10. The LED light string according to claim 7, wherein a resistor element is connected in series with the first conductive pin or the second conductive pin.

11. The LED light string according to claim 7, wherein a second end of the glass shade opposite to the first end is provided with a sealing end formed by sintering the glass shade, and a sealed cavity is formed inside the glass shade.

12. The LED light string according to claim 11, wherein the sealing connection base has a cambered surface, and the sealing end has a tip.

* * * * *